United States Patent [19]

Morrison

[11] 4,136,574
[45] Jan. 30, 1979

[54] COUNTERSHAFT GEAR BOXES

[76] Inventor: William M. M. Morrison, Shandon 107, Coalway Rd., Wolverhampton, Staffordshire, England

[21] Appl. No.: 692,230

[22] Filed: Jun. 2, 1976

Related U.S. Application Data

[63] Continuation of Ser. No. 431,408, Jan. 7, 1974, abandoned, which is a continuation of Ser. No. 164,805, Jul. 26, 1971, abandoned.

[30] Foreign Application Priority Data

Jul. 28, 1970 [GB] United Kingdom ............... 36417/70

[51] Int. Cl.² .................... F16H 3/08; F16H 37/00
[52] U.S. Cl. ........................................ 74/359; 74/740
[58] Field of Search ................ 74/325, 329, 359, 360, 74/740

[56] References Cited
U.S. PATENT DOCUMENTS

| | | | |
|---|---|---|---|
| 2,246,636 | 6/1941 | Peterson et al. | 74/359 X |
| 2,333,668 | 11/1943 | Neracher et al. | 74/740 X |
| 3,078,975 | 2/1963 | Eaton | 74/339 X |
| 3,115,047 | 12/1963 | Lunn et al. | 74/359 X |
| 3,202,005 | 8/1965 | Ivanchich | 74/359 X |

*Primary Examiner*—Samuel Scott
*Assistant Examiner*—Lance W. Chandler
*Attorney, Agent, or Firm*—Holman & Stern

[57] ABSTRACT

A gear box in which there is provided an input shaft, a coaxial relatively rotatable output shaft, a lay shaft carrying a gear meshing with one on the output shaft, meshing gears carried on the lay shaft and on the input shaft, synchronizers on the lay shaft and input shaft for selectively connecting the gears thereon, all forward gear speeds being synchronized, and the gears for each speed arranged sequentially from an input and to an output end of the gear box.

3 Claims, 3 Drawing Figures

COUNTERSHAFT GEAR BOXES

This is a continuation of application Ser. No. 431,408 filed Jan. 7, 1974 now abandoned which in turn is a Rule 60 Continuation of Ser. No. 164,805, filed July 26, 1971, abandoned.

BACKGROUND OF THE INVENTION

This invention relates to gear boxes primarily for use on motor vehicles and providing a number of speed ratios between an input shaft adapted to be driven by a prime mover and an output shaft. Reference is made to copending U.S. Ser. No. 340,282, filed Mar. 12, 1973.

PRIOR ART

Gear boxes in use at the present time are subject to certain common faults such as jumping out of gear and the inability of gears to become meshed without damage during a gear change sequence. The first of these faults is due, in principle, to the fact that substantially all the torque applied by the prime mover is transmitted through the meshing gears which themselves must be moved or disengaged during gear change sequences.

The problem of ensuring meshing between gears or between dogs carried by respective gears or other parts, has been solved by the use of synchronizers which connect the gears or parts together through a form of slipping clutch. These synchronizers, however, have limitations. If a gear ratio change of more than, for example, 4.5 to 1 is attempted, a synchronizer will not effectively provide the necessary control.

OBJECT AND SUMMARY OF THE INVENTION

The object of this invention is to provide a gear box in which the problems referred to are alleviated without impairing the efficiency.

BRIEF DESCRIPTION OF THE DRAWINGS

The invention will now be described by way of example with reference to the accompanying drawings in which:

With reference to FIG. 1, there is shown a four speed gear box having a composite casing comprising a centre section 10 and two dissimilar end casing portions 11, 12.

DETAILED DESCRIPTION OF THE INVENTION

Figure 1:
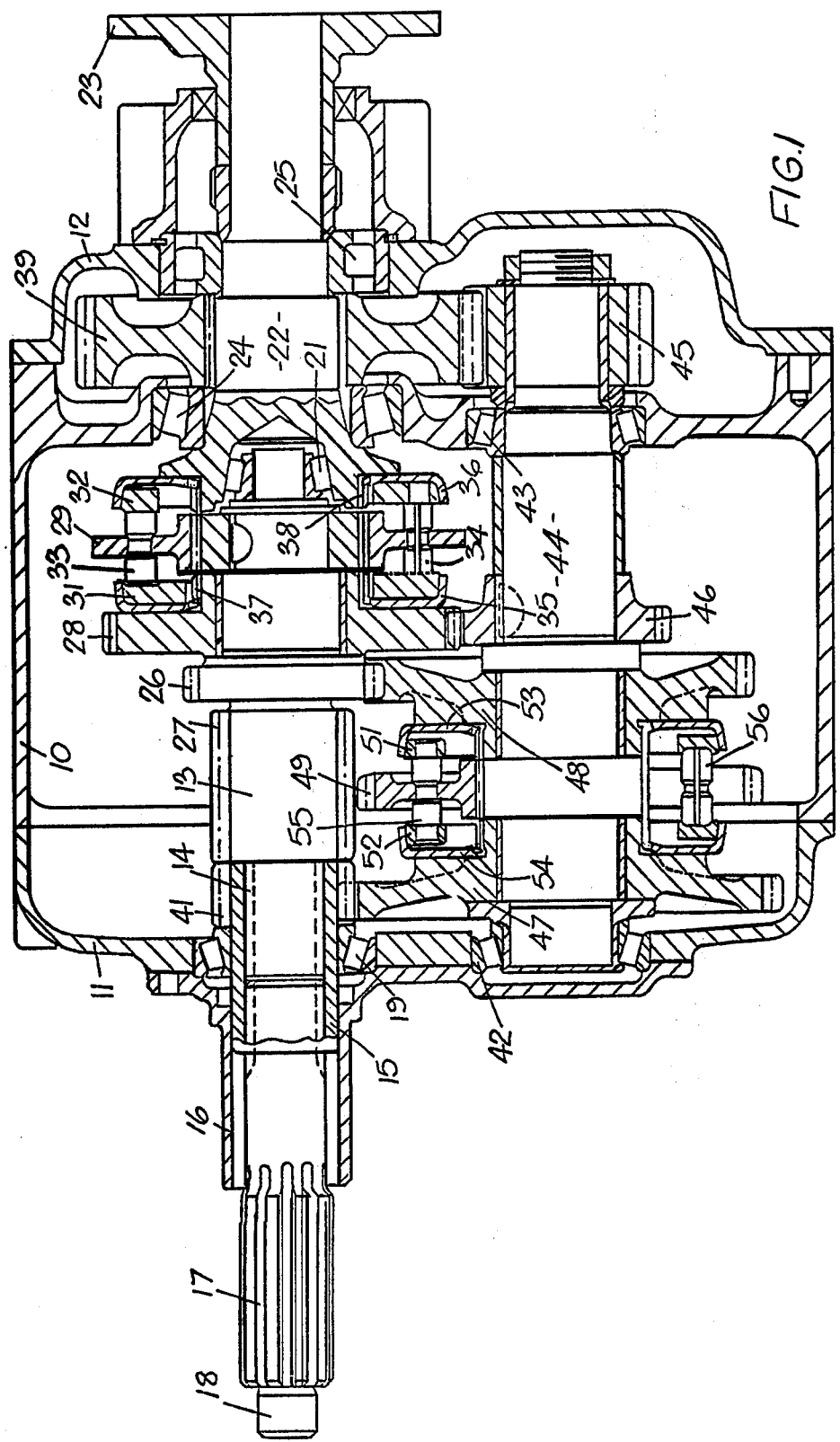
FIG. 1 is a side elevation cross sectional view of a four speed gear box constructed in accordance with the invention.

Mounted within the casing is an input shaft 13 which, at one end, is splined at 14. This splined portion 14 engages in a hollow sleeve 15 which is provided with a complementary internal portion. The splined portion in the interior of the sleeve 15 is longer than the splined portion 14 on the input shaft 13. In the open end of the sleeve 15 is engaged a further externally extending shaft 16. The splined portion in which this shaft 16 engages is less tight than that in which the input shaft 13 engages, to allow some axial misalignment to be accommodated.

The outward end is also provided with a spline 17 and terminates in a portion 18 which can be located in a clutch mechanism or fly wheel assembly of a prime mover with which the gear box is to be associated.

The sleeve 15 is journalled in a taper roller bearing 19 and the opposite end of the input shaft 13 is also mounted on a taper roller bearing 21 which is mounted in a recess formed in the inner end of an output shaft 22.

The output shaft 22 extends out of the casing at the opposite end from the input shaft and carries a connecting flange member 23 for engagement with a transmission. The input shaft 13 and the output shaft 22 are coaxial.

The output shaft 22 is mounted in a taper roller bearing 24 at the end in which the taper roller bearing 21 is housed and it is also supported on a plain roller bearing 25 in the casing.

The input shaft 13 has, formed integrally therewith, a gear wheel 26 and an elongated pinion 27. Journalled on the end of the input shaft near the bearing 21 is a further gear 28. Secured to the end of the input shaft, immediately adjacent to the bearing 21, is a ring 29 which is part of a synchronizer mechanism of known form. The synchronizer mechanism has inwardly presented channelled rings 31, 32 at opposite sides of the ring 29 respectively, and engaged by split collets 33 and waisted pins 34 which are carried in the ring 29.

The rings 31, 32 have externally presented frusto conical surfaces which can engage with complementary internal frusto conical surfaces in a pair of further rings 35, 36 respectively. The ring 35 has internal teeth engaging with a set of teeth 37 formed integrally with the gear wheel 28.

The other ring 36 engages with gear teeth 38 formed on the end portion of the output shaft 22.

The output shaft 22 has secured thereto a large gear wheel 39. The sleeve 15 on the input shaft has formed thereon an external set of teeth forming a gear wheel 41.

Also mounted in the casing on taper roller bearings 42, 43 is a lay shaft 44. The lay shaft carries a pinion 45 which is non-rotatably secured thereon and which is permanently in mesh with the large gear wheel 39 on the output shaft 22. The lay shaft 44 has keyed thereon a gear wheel 46 which is in mesh with the gear wheel 28 which is in turn journalled on the input shaft 13.

Also mounted on the lay shaft and journalled thereon are two further gear wheels 47, 48. A ring 49 which is externally toothed, forms the center member of a further pair of synchronizers similar to the synchronizers associated with the ring 29. The synchronizers incorporate respective rings 51, 52 having external taper surfaces engaging in respective rings 53, 54 and are connected by waisted pins 55 and split collets 56.

The rings 53 and 54 are connected to the gear wheels 48 and 47 respectively.

There is selector mechanism (not illustrated) which is capable of actuating the rings 29 and 49 to engage gears as will be described.

The ring 49, moreover, is capable of being connected with a further gear wheel which is itself connected with the gear 27 for the purpose of achieving reverse drive, as will be described. The further gear wheel is not shown.

In operation the gearbox is connected to a prime mover, through a clutch mechanism by means of the input shaft 17, and to accommodate any misalignment the splined connection between the sleeve 15 and the shaft 17 is provided.

The output shaft is connected by means of its flange 23 to a transmission for a vehicle and when the parts are all as illustrated, there is no drive between the input shaft 13 and the output shaft 22. In order to engage direct drive, which is top gear, it is necessary to actuate the synchronizer by means of the ring 29. This is moved to the right so that the collets are tilted to engage within the channel of the ring 32. This causes the ring 32 to engage with the corresponding ring 36, whereupon there will be created a positive drive connection between the input shaft through the ring 29 and the rings 32 and 36 to the output shaft 22.

As soon as the output shaft 22 begins to rotate, the large gear wheel 39 will also rotate, which in turn rotates the lay shaft 44 through the gear 45.

When the lay shaft rotates, the gear wheel 46 will also rotate and will therefore turn the gear wheel 28, but because this is journalled on the input shaft, no torque will be applied through this mechanism.

Should it be required to increase the speed ratio between the input and output shafts, it is necessary that the direct drive be disconnected, and that an intermediate drive be engaged. This is accomplished by moving the ring 29 to the left, first disengaging the direct drive through the rings 32 and 36, and subsequently engaging drive between the rings 29 and the gear wheel 28, through the rings 31 and 35. The drive path is now through the gear wheel 28, which is effectively connected to the input shaft 13, and by means of the lay shaft 44 through the permanently meshing gears 45 and 39 to the output shaft 22.

If it is required still further to increase the speed ratio between the input and output shafts, the driving connection through the gear wheels 28 and 46 is disconnected, and the gear wheel 48 is locked to the lay shaft by means of the rings 51 and 53 following upon movement of the ring 49 to the right.

The drive now takes place through the integral gear wheel 26 formed on the input shaft 13 and through the lay shaft to the output shaft 22.

The lowermost gear which can be selected in this gear box is achieved through the gear wheel 47 engaging the sleeve 15 which is splined to the input shaft 13.

This is engaged by movement of the ring 49 to the left. The selector mechanism which achieves this is, in this example, under manual control, though it is to be understood that semi-automatic or fully automatic control of the selector mechanisms can be incorporated.

To select reverse, the rings 29 and 49 are moved to their respective neutral positions as illustrated, and a further portion on the selector mechanism is used to engage the further gear wheel whereby the ring 49 and the gear 27 are connected. Reverse drive therefore takes place between the input shaft 13 and the output shaft 22 through the lay shaft 44.

The gearbox thus described has certain advantages particularly in that the synchronizers are called upon only to synchronize their respective members between the same speed ranges. In a typical vehicle, the peak revolutions and the maximum revolutions representing the normal range at which gear changes take place, either up or down, occur at 2,400 and 3,300 revolutions per minute respectively. The synchronizers are therefore only called upon to operate between these ranges for each gear change.

The gear ratios are selected so that the synchronizers are not required to control synchronizations over a range at which their efficiency is impaired. The constant mesh gears 45 and 39 transmit the greater part of the load in the intermediate ratios, thus minimizing the torque which is applied through the intermediate gears themselves.

Figure 2:
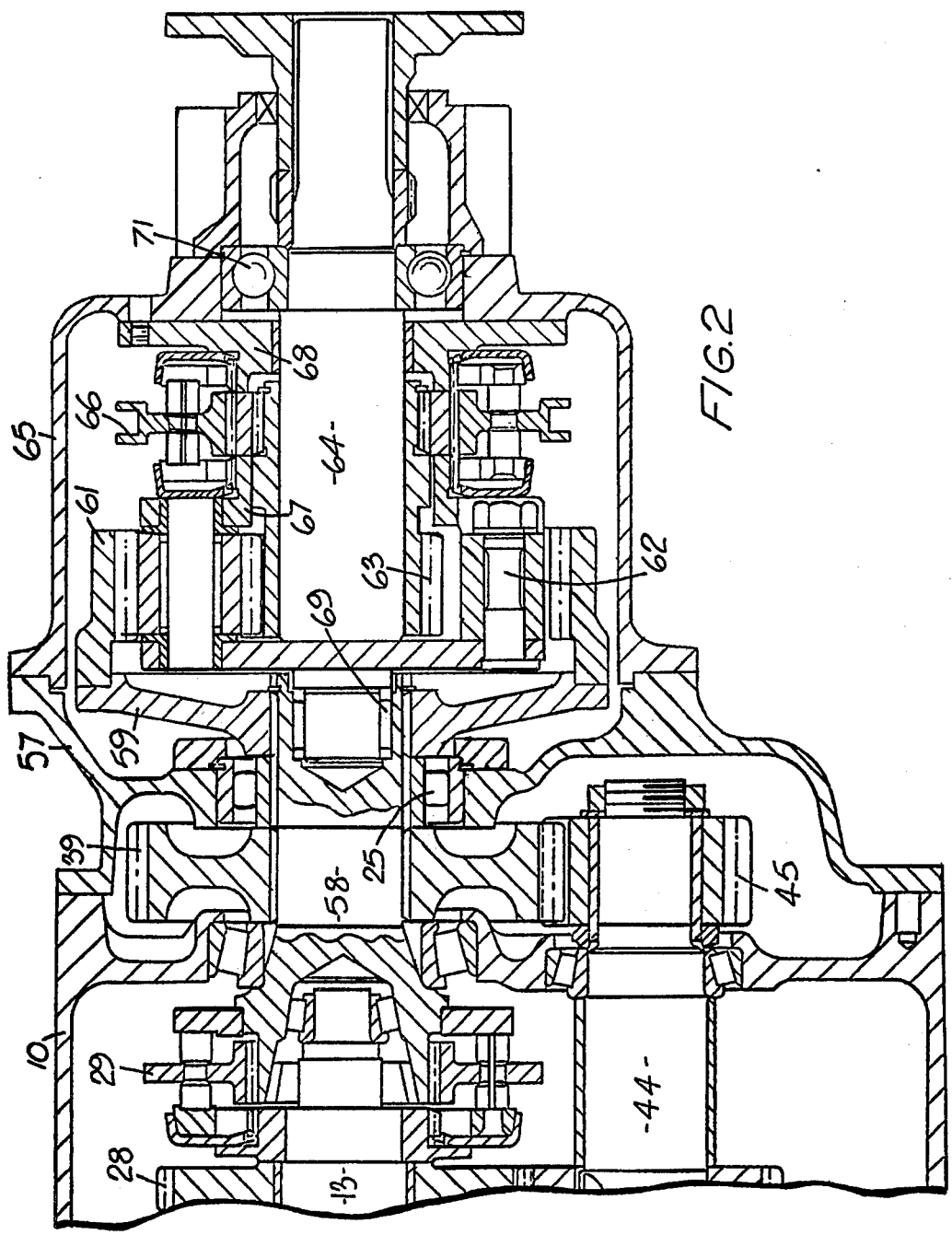
FIG. 2 is a side elevation cross-sectional view of the gear box shown in FIG. 1 with the addition of a splitter box.

FIG. 2 shows the gearbox with a splitter device attached. The rear casing end portion 12 is replaced by a further casing 57 and the output shaft 22 is replaced by a shorter output shaft 58 which is splined and has engaged thereon, a member 59 which is secured to a cage 61 for an epicyclic mechanism indicated generally at 62. This epicyclic mechanism incorporates planet pinions, which in turn engage with a toothed ring 63 formed on a further output shaft 64. The epicyclic mechanism is housed within a casing 65 which also houses a pair of synchronizers actuated by a ring 66, the synchronizers being identical with or substantially identical with those actuated by the ring 29.

The synchronizers are capable of engaging or disengaging rings 67, 68 respectively, which permit ratio changes between the shafts 58 and 64 to be achieved. The shaft 64 is carried in a recess in the shaft 58 by mean of needle roller bearings 69 and by a ball bearing 71.

The splitter device is arranged to provide for two sets of ratios, and can be modified to provide a ratio range change in known manner.

Figure 3:
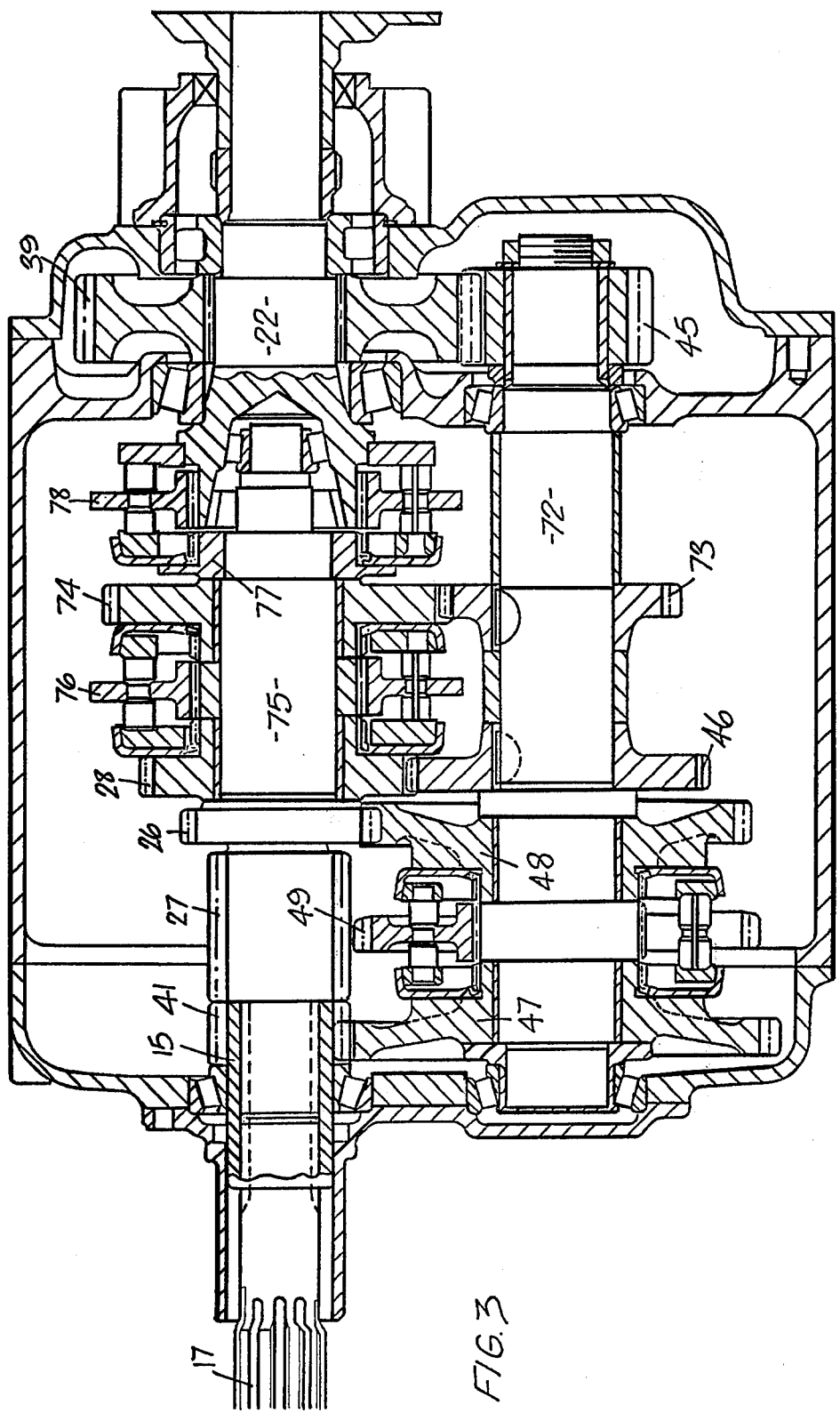
FIG. 3 is a side elevation cross-sectional view of a five speed gear box constructed in accordance with the invention.

FIG. 3 illustrates a five speed gearbox which is identical with the four speed gearbox but has, in addition, mounted on the extended lay shaft 72, a further gear 73 which is in addition to the gear 46.

The gear 73 meshes with a further gear 74 journalled on the extended input shaft 75. Between the gear wheel 74 unit the gear wheel 28, which are journalled on the input shaft 75, is a synchronizer actuated by a ring 76.

Since the gear wheel sets 28, 46, 74, 73 are of different sizes, different ratios result when the synchronizers are used to select one or other set.

A further synchronizer is connected to a member 77 which is non-rotatably secured to the end of the input shaft 75. By means of an actuator ring 78, direct drive between the input shaft 75 and the output shaft 72 can be achieved.

The lay shaft carries the gear 45 which meshes with the large gear 39 is similar manner to the FIG. 1 construction.

The lower two ratios are, furthermore, achieved in similar manner to those of the FIG. 1 construction, similar parts being designated by the same numerals.

Six speed mechanisms can be made by adding a further gear wheel set.

Power take off drive and indirect output drive can be incorporated.

The gear ratios may be varied by changing the sizes of the respective gear wheels, this being common practise. Furthermore the main drive between the lay shaft and the output shaft through the permanently meshing gears may be of different ratio to that illustrated in each example.

I claim:

1. A gear box including a casing having separate input and output ends, an input shaft extending into the casing through the input end, an output shaft extending into the casing through the output end, said input shaft and output shaft being coaxial and relatively rotatable, a lay shaft rotatably mounted in the casing in parallel relationship with the input and the output shafts, an output gear mounted on said output shaft, a complementary output gear permanently in mesh with said output gear mounted on the output shaft and being mounted at one end of said lay shaft, all gears for forward speeds being grouped in meshing pairs, one gear of each pair on said input shaft and lay shaft respectively, each said meshing pair of gears providing a different speed ratio, each speed ratio pair of gears arranged sequentially in accending speed ratio order from said input end towards said output end, synchronizer means for selectively synchronizing all pairs of gears for forward speeds, a synchronizer on the lay shaft for selectively connecting at least the lowest speed ratio pair of gears, at least one further speed ratio pair of gears having one of the pair of gears rotatably carried on the input shaft and the other of the pair of gears being fixed on the lay shaft, a further synchronizer on the input shaft for selectively connecting said further speed ratio gear on the input shaft thereto, whereby all meshing pairs of gears selectively transmit torque from the input shaft through the lay shaft and the complementary output gears to the output shaft.

2. The gear box as claimed in claim 1, further including bearing means for rotatably mounting said lay shaft, said bearing means comprising one lay shaft bearing means positioned between said complementary output gear and another lay shaft gear and another lay shaft bearing means being positioned at the end of said lay shaft remote from said complementary output gear.

3. The gear box as claimed in claim 1, wherein said input shaft is splined at the input end, and further including a splined sleeve in one end of which is engaged the input end of said input shaft, a further splined shaft engaged in the other end of said splined sleeve.

* * * * *